H. C. KEPHART.
COMBINED INSURANCE CONTRACT AND HOTEL RECEIPT.
APPLICATION FILED JUNE 8, 1917.

1,310,912.

Patented July 22, 1919.

Inventor
Harry C. Kephart.
By
Attorney

UNITED STATES PATENT OFFICE.

HARRY C. KEPHART, OF DENVER, COLORADO.

COMBINED INSURANCE-CONTRACT AND HOTEL-RECEIPT.

1,310,912. Specification of Letters Patent. Patented July 22, 1919.

Application filed June 8, 1917. Serial No. 173,443.

*To all whom it may concern:*

Be it known that I, HARRY C. KEPHART, a citizen of the United States, residing in the city and county of Denver and State of Colorado, have invented certain new and useful Improvements in Combined Insurance-Contract and Hotel-Receipts; and I do declare the following to be a full, clear, and exact description of the invention such as will enable others skilled in the art to which it appertains to make and use the same, reference being had to the accompanying drawings, and to the characters of reference marked thereon, which form a part of this specification.

The present invention relates to a combined receipt for money paid and an insurance contract or policy, the document comprising on one side a part adapted to be filled in to constitute a receipt, the same side of the document also containing a statement that a certain insurance company in consideration of the receipted bill or statement will insure the person to whom the receipt is given subject to the condition named in the policy or contract on the reverse side of the document, the said policy being of any suitable form but arranged to have the name of the person to whom the receipt is given specified therein as well as the amount for which the receipt is given, the latter serving as the premium for the policy, the period for which the insurance is given, depending upon the amount specified in the receipt. The reverse side of the document contains a space for the insurance record, which is a facsimile of the receipt above mentioned and also the body of the policy, the two being separated by a transverse row of perforations to facilitate the severance of the parts. The insurance record blank or stub and the original receipt are provided with certain tabulated indices and are adapted to be filled in to contain the place, time, insured's name and address, the beneficiary's name, the time of issue, length of duration, number of agency and registration number of the policy.

The documents may be made as leaves of a book or in pad form and each is provided with the receipt blank and insurance record blank provided on opposite ends and on the reverse faces thereof, whereby, as the policy is made out it can be folded once to bring the two blanks in juxtaposition. By placing a piece of carbon paper between the two and filling in the proper data on the one a carbon copy will be made simultaneously on the other. The instrument is then severed along the line of perforations and the part given to the insured contains the policy on one side and the original receipt on the other, while the part retained in the book or pad is a stub carbon copy of the receipt.

The invention is used more particularly to enable hotel proprietors to issue to their guests for periods limited as they may think proper, insurance policies as the guests pay their bills, the receipt for the amount paid being made out on the said instrument as heretofore indicated.

It is believed that an instrument of this character will be advantageous to hotel proprietors as forming an inducement to guests to stop where these policies are known to be used, while at the same time it will be advantageous to their guests and more particularly to those whose business requires considerable traveling.

Having briefly outlined the present improvement it will now be described in detail reference being made to the accompanying drawing in which is illustrated an embodiment thereof.

In the drawing:—

Figure 1 is a face view of the instrument illustrating the body of the policy and the record blank.

Fig. 2 is a similar view showing the receipt blank on the reverse side of the instrument when it is folded on the line 2—2.

Fig. 3 is a transverse section taken on the line 3—3 of Fig. 2.

Referring now to the drawings, Fig. 1 is a face view of one embodiment of the present invention showing the insurance policy and record blank. The insurance record 5 as it may be termed is located at the left-handed side of the instrument and is substantially rectangular in shape being co-extensive with the larger oblong portion 6 of the instrument upon which the body of the contract is printed. The two portions 5 and 6 are joined together, a row of perforations 7 making a severance of the two a very easy and simple matter. The record portion of the instrument contains a number of blank places intended to be properly filled in to give an insurance record, including the place and date of the policy, the name of the persons insured, the amount of the insurance, the time of issue, the agency number and the registered number of the policy. The precise arrangement of the blanks on the portion 5, which are to be filled in by such data may be varied according to the desired appearance of the instrument. As previously stated, the record slip 5 is located at the left hand end of the main or body part 6 of the policy.

A duplicate arrangement 8 of markings and blanks constituting a receipt form is provided on the reverse face of the main or body portion 6. This set of markings is at the extreme right hand end of the instrument and appears in dotted lines in Fig. 1. Thus when the instrument is folded once along the transverse medial line 2—2 the receipt blank 8 will be face up and will be superimposed on the similar insurance record blank 5 above referred to. By inserting an ordinary piece of carbon or copying paper 9 between the two, the blank 8 which is formed on the reverse side of the policy 6 will be written as the original receipt or insurance record, while at the same time a carbon copy or stub record 5 will be made which, when the policy is detached along the line 7 will remain in the company's book.

The manner or system of handling the combined insurance contract and receipt will be readily understood. Assume that the receipt is to be given in payment for the bill of a hotel guest; as soon as the guest is ready to leave the hotel he goes to pay his bill, the improved instrument will be produced and the receipt will be prepared by folding the part 6 along the line 2—2 and filling in the proper places on the blank 8 whose face will be uppermost. It will be understood that in writing in the necessary data a piece of carbon paper 9 will be interposed between the stub record 5 and the superimposed receipt 8. The receipt will be filled out by placing on the blank 8 the name of the guest, John Smith; the location of the hotel, Denver, Colo.; the address of the insured, New York, N. Y.; the name of the beneficiary, Mrs. Mary Smith; the date of issue of the policy, 11/2/16; the hour of issue, 11:45 A. M. and the term or period for which the policy is issued, 24 hours.

Of course the data just mentioned will vary according to circumstances, the same being indicated in the drawing for purposes of illustration only but which will serve as a guide in using the instrument under all circumstances. The register number of the policy, 1548, and the number of the local agency from which the policy is obtained, i. e. 151, will also appear in the prescribed places. It will be understood that all of this data is reproduced in carbon form upon the stub 5 and that as the main part of the policy 6, having the original receipt 8 on its back, is torn off along the line of perforations 7 the stub will remain as a permanent record in the book or pad from which the numerous policies are drawn up.

Having described my invention what I claim is:

An instrument of the class described comprising two separable sections adapted to be folded with parts of their obverse faces together, a form for an insurance policy on the front face of one section, a form for a record on the front face of the other section, a form for a receipt on the reverse face of the first named section corresponding to and so located with respect to the record form that the two forms may be made to register when the sheet is folded, whereby a carbon copy of the receipt may be produced on the record form when the forms are superposed.

In testimony whereof I affix my signature.

HARRY C. KEPHART.

Copies of this patent may be obtained for five cents each, by addressing the "Commissioner of Patents, Washington, D. C."